US012755151B2

(12) United States Patent
Neumann et al.

(10) Patent No.: US 12,755,151 B2
(45) Date of Patent: Oct. 6, 2026

(54) METHOD FOR ESTIMATING MODEL UNCERTAINTIES WITH THE AID OF A NEURAL NETWORK AND AN ARCHITECTURE OF THE NEURAL NETWORK

(71) Applicant: Robert Bosch GmbH, Stuttgart (DE)

(72) Inventors: Gerhard Neumann, Karlsruhe (DE); Michael Volpp, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 601 days.

(21) Appl. No.: 18/349,571

(22) Filed: Jul. 10, 2023

(65) Prior Publication Data

US 2024/0020535 A1 Jan. 18, 2024

(30) Foreign Application Priority Data

Jul. 18, 2022 (DE) ..................... 10 2022 207 279.0

(51) Int. Cl.
*G06N 3/08* (2023.01)
*G06N 3/04* (2023.01)

(52) U.S. Cl.
CPC ................. *G06N 3/08* (2013.01); *G06N 3/04* (2013.01)

(58) Field of Classification Search
None
See application file for complete search history.

(56) References Cited

PUBLICATIONS

Volpp, Michael, et al. "Bayesian context aggregation for neural processes." International Conference on Learning Representations. 2020. (Year: 2020).*

Volpp et al., "Bayesian Context Aggregation for Neural Processes," ICLR 2021, 2021, pp. 1-29. <https://openreview.net/pdf?id=ufZN2-aehFa>.

* cited by examiner

*Primary Examiner* — Eric Nilsson
(74) *Attorney, Agent, or Firm* — Norton Rose Fulbright US LLP

(57) ABSTRACT

A computer-implemented method for estimating uncertainties using a neural network, in particular, a neural process, in a model. The model models a technical system and/or a system behavior of the technical system. An architecture of the neural network for estimating uncertainties is also described.

12 Claims, 2 Drawing Sheets

METHOD FOR ESTIMATING MODEL UNCERTAINTIES WITH THE AID OF A NEURAL NETWORK AND AN ARCHITECTURE OF THE NEURAL NETWORK

CROSS REFERENCE

The present application claims the benefit under 35 U.S.C. § 119 of German Patent Application No. DE 10 2022 207 279.0 filed on Jul. 18, 2022, which is expressly incorporated herein by reference in its entirety.

FIELD

The present invention relates to a method for estimating uncertainties with the aid of a neural network and to an architecture of the neural network.

BACKGROUND INFORMATION

In technical systems, in particular, safety-critical technical systems, it is possible to use models, in particular, models for active learning, reinforcement learning or extrapolation, for predicting uncertainties, for example, with the aid of neural networks.

More recently, neural processes (NPs) are used for the prediction of model uncertainties. Neural processes are essentially a family of architectures based on neural networks, which create probabilistic predictions for regression problems. They automatically learn inductive distortions, which are tailored to a class of target functions with a type of shared structure, for example, quadratic functions or dynamic models of a particular physical system with varying parameters. Neural processes are trained using so-called multi-task training methods, where a function corresponds to a task. The resulting model provides exact predictions about unknown target functions on the basis of only a few context observations.

The NP architecture is normally made up of a neural encoder network, an aggregator module and a neural decoder network. The encoder network and the aggregator module calculate a latent representation, i.e., the mean value $\mu_z$ and the variance $$\sigma_z^2$$

parameters of a Gaussian distribution via a latent variable z, from a set of contexts Dc of observations, i.e., $$p(z|D^c) = N(z|\mu_z, \sigma_z^2).$$

This may also be described as $$(\mu_z, \sigma_z^2) = encagg_\phi(D^c),\ encagg_\phi$$

referring to the neural encoder network and aggregator module with trainable weights $\phi$.

The neural decoder network parameterizes a Gaussian output distribution, i.e., the likelihood $$p(y|x, z) = N(y|\mu_y, \sigma_n^2).$$

The neural decoder network receives a target input location x together with a random sample z from the latent distribution and calculates the average μy-parameter of the output distribution, i.e., $\mu_y$=decθ(y,z), $dec_\theta$ referring to a neural decoder network with weights θ and $$\sigma_n^2$$

describing the observation noise.

The NP training method optimizes the weights θ and $\phi$ together in order to maximize the marginal prediction probability.

An object of the present invention is to provide an economical, for example, a time-saving and/or computer time-saving and/or memory space-saving method for parameterizing the NP architecture.

SUMMARY

One specific embodiment of the present invention relates to a computer-implemented method for estimating uncertainties with the aid of a neural network, in particular, a neural process, in a model, the model modeling a technical system and/or a system behavior of the technical system, a model uncertainty being determined in a first step as a variance $\sigma_z^2$ of a Gaussian distribution and as a mean value of the Gaussian distribution via latent variables z from a set of contexts, and a mean value of the output of the model being determined in a further step as a function of an input location with the aid of a neural decoder network based on the Gaussian distribution, the latent variables z being the weights of the neural decoder network.

According to the present invention, it is provided that a respective latent variable is not forwarded as an input to the neural decoder network, rather it corresponds to the weights of the neural decoder network. Thus, compared to the conventional method from the related art, the respective latent variable is reinterpreted. In conventional methods, the latent variable together with the input location is transferred to the decoder. Thus, according to the present invention, the neural decoder network receives only the input location, and a respective sample, i.e., a respective latent variable, from the latent Gaussian distribution corresponds to an instantiation of the neural decoder network.

The present invention thus provides a more economical way of parameterizing the neural decoder network. According to the present invention, the neural decoder network includes no trainable weights.

Conventional methods from the related art further require often disproportionately large decoder architectures, even for comparatively simple problems. This is also due to the fact that for a comparatively small decoder architecture, it would be difficult to interpret different meanings of the two inputs, latent variable and input location. Since according to the present, it is provided that the neural decoder network now only receives the input location as the input, it is possible to use smaller decoder architectures. The method according to the present invention may be carried out using smaller NP architectures that include fewer trainable parameters. This makes it possible to carry out the method while requiring less memory and/or less computing power.

According to one specific embodiment of the present invention, it is provided that the variance $\sigma_z^2$ of the Gaussian distribution, where $$\sigma_z^2 = \sigma_z^2(D^c),$$

is calculated via the latent variable z from a set of contexts $D^c$ of observations, i.e., $$p(z|D^c) = N(z|\mu_z(D^c), \sigma_z^2(D^c)).$$

This latent distribution allows for an estimate of the model uncertainty by the variance $\sigma_z^2$. In principle, such an estimate is generally not exact, but is subject to an uncertainty. This is the case when the set of contexts $D^c$ is not informative enough in order to determine the function parameters, for example, due to ambiguity of the task, for example, when multiple functions are able to generate the same set of context observations. This type of uncertainty is referred to as model uncertainty and is to be quantified by the variance $\sigma_z^2$ of the latent space distribution $p(z|D^c)$. The variance $\sigma_z^2$ is calculated specifically via $$\sigma_z^2 = \sigma_z^2(D^c) \text{ and } p(z|D^c) = N(z|\mu_z(D^c), \sigma_z^2(D^c)).$$

According to one specific embodiment of the present invention, it is provided that the mean value $\mu_z$ of the Gaussian distribution, where $\mu_z = \mu_z(D^c)$, is calculated via the latent variable z from a set of contexts $D^c$ of observations, i.e., $$p(z|D^c) = N(z|\mu_z(D^c), \sigma_z^2(D^c)).$$

This latent distribution enables an estimate of the function parameters by the mean value $\mu_z$. The mean value $\mu_z$ is calculated, for example, specifically via $$\mu_z = \mu_z(D^c) \text{ and } p(z|D^c) = N(z|\mu_z(D^c), \sigma_z^2(D^c)).$$

According to one specific embodiment of the present invention, it is provided that the latent variables z are extracted from the variance $\sigma_z^2$ of the Gaussian distribution and from the mean value $\mu_z$ of the Gaussian distribution of the output of the model. Extracting is understood to mean that the latent variables z are "drawn" or "sampled" from the Gaussian distribution or are "instantiated" by the Gaussian distribution.

According to one specific embodiment of the present invention, it is provided that the neural decoder network parameterizes the output of the model, i.e., the probability $$p(y|x, z) = N(y|\mu_z, \sigma_n^2).$$

The mean value $\mu_y$ of the output of the model is parameterized by $\mu_y = \text{dec}_z(x)$.

Further specific embodiments of the present invention relate to architecture of a neural network, in particular, of a neural process, the neural network being designed to carry out steps of a method according to the described specific embodiments for estimating uncertainties in a model, the model modeling a technical system and/or a system behavior of the technical system. The neural network includes at least one neural decoder network, the latent variables z being the weights of the neural decoder network.

According to one specific embodiment of the present invention, it is provided that the neural network includes at least one neural encoder network and/or at least one aggregator module, the neural encoder network and/or the aggregator module being designed to determine a model uncertainty as a variance $\sigma_z^2$ of a Gaussian distribution and a mean value $\mu_z$ of the Gaussian distribution via latent variables z from a set of contexts $D^c$.

Further specific embodiments of the present invention relate to a training method for parameterizing a neural network including an architecture according to the described specific embodiments, the method including the training of weights for the neural encoder network and/or for the aggregator module, and the latent variables z being the weights of the neural decoder network.

According to the architecture according to the present invention and to the training method according to the present invention, the trainable weights of the NP architecture are reduced as compared to the architectures from the related art from $\phi$, $\theta$ to only $\phi$. The present invention therefore represents a more economical training method for parameterizing the NP architecture.

The training method is, for example, a multi-task training method. In a multi-task training method, a function, i.e., a task, corresponds to a problem. Multiple problems are solved simultaneously in order in this way to utilize commonalities and differences between the problems. This may result in an improved learning efficiency and prediction accuracy for the problem-specific models, compared to the separate training of the models.

A method according to the present invention and a neural network 200, 300, in particular, a neural process, including an architecture according to the present invention, may be used for ascertaining an, in particular, inadmissible deviation of a system behavior of a technical system from a standard value range.

According to an example embodiment of the present invention, when ascertaining the deviation of the technical system, an artificial neural network is used, to which input data and output data are fed in a learning phase. As a result of the comparison using the input data and output data of the technical system, the corresponding links in the artificial neural network are created and the neural network is trained on the system behavior of the technical system.

In a prediction phase following the learning phase, it is possible to reliably predict the system behavior of the technical system with the aid of the neural network. For this purpose, input data of the technical system are fed to the neural network in the prediction phase and output comparison data are calculated in the neural network, which are compared with output data of the technical system. If this comparison indicates that the output data of the technical system, which have been detected preferably as measured values, deviate from the output comparison data of the neural network and the deviation exceeds a limiting value, then an inadmissible deviation of the system behavior of the technical system from the standard value range is present. Suitable measures may thereupon be taken, for example, a warning signal may be generated or stored or sub-functions of the technical system may be deactivated (degradation of the technical unit). In the case of the inadmissible deviation, a switch may, if necessary, be made to alternative technical units.

According to the present invention, a real technical system may be continuously monitored with the aid of the method described above. In the learning phase, the neural network is fed a sufficient number of pieces of information of the technical system both from its input side as well as from its output side, so that the technical system is able to be mapped and simulated in the neural network with sufficient accuracy. This allows the technical system in the subsequent prediction phase to be monitored and a deterioration of the system behavior to be predicted. In this way, the remaining service life of the technical system, in particular, is able to be predicted.

BRIEF DESCRIPTION OF THE DRAWINGS

Further features, possible applications and advantages of the present invention result from the following description of exemplary embodiments of the present invention, which are represented in the figures. All features described or represented in this case, alone or in arbitrary combination, form the subject matter of the present invention, regardless of their wording or representation in the description herein or in the figures.

DETAILED DESCRIPTION OF EXAMPLE EMBODIMENTS

A computer-implemented method for estimating uncertainties with the aid of a neural network, in particular, a neural process, in a model, the model modeling a technical system and/or a system behavior of the technical system, is described below with reference to the figures. According to the method, a model uncertainty is determined in one step as a variance $\sigma_z^2$ of a Gaussian distribution and as a mean value $\mu_z$ of the Gaussian distribution via latent variables z from a set of contexts $D^c$, and a mean value $\mu_y$ of the output of the model is determined in a further step as a function of an input location x with the aid of a neural decoder network based on the Gaussian distribution.

Figure 1:
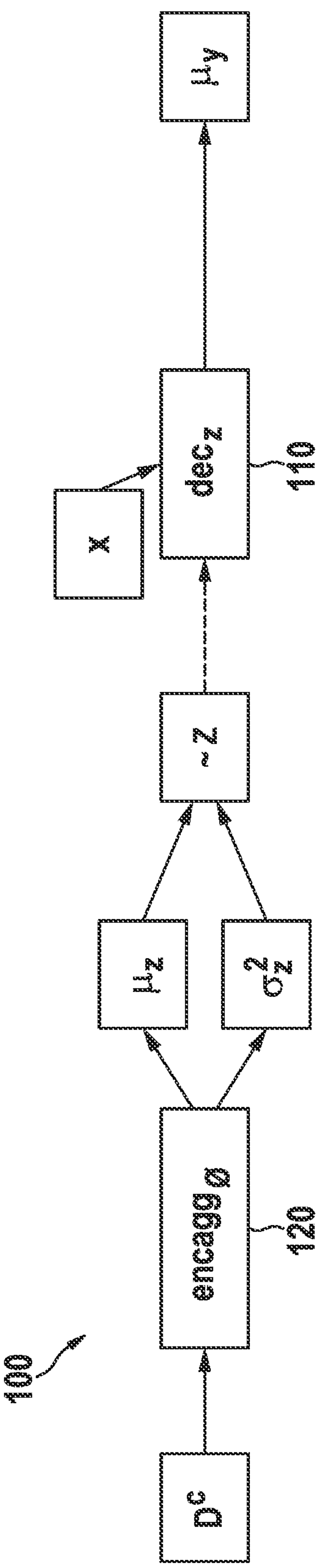
FIG. 1 shows an architecture of a neural process according to one specific embodiment of the present invention.

FIG. 1 shows in a schematic and simplified manner an architecture of a neural network 100, in particular, a neural process, neural network 100 being designed to carry out steps of a method according to the described specific embodiments for estimating uncertainties in a model.

Neural network 100 according to FIG. 1 includes a neural decoder network 110, neural decoder network 110 being trained to determine a mean value $\mu_y$ of the output of the model based on the Gaussian distribution as a function of an input location x.

Latent variable z is a task-specific latent random variable, which characterizes a probabilistic character of the entire model. For the sake of simplicity, task indices are not used below. For example, for two given observation tuples $(x_1,y_1)$ and $(x_2,y_2)$ of a one-dimensional quadratic function y=f(x) as a set of contexts, the latent distribution is to provide an estimate of a latent embedding of the function parameters, for example, the parameters a, b, c in $y=ax^2+bx+c$.

Neural decoder network 110 parameterizes the output of the model, i.e., the probability $$p(y|x, z) = N(y|\mu_z, \sigma_n^2).$$

From the perspective of the model, $\sigma_y^2=\sigma_n^2$ is applicable, i.e., the output variance $\sigma_y^2$ may be used in order to estimate the generally unknown noise variance. In most applications, the data are subject to noise, i.e., $y=y'+\epsilon$, $\epsilon$ being able to be modeled as a Gaussian-distributed variable, i.e., $$\epsilon \sim N(\epsilon|0, \sigma_n^2)$$

with the mean value zero. The most frequently encountered situation in practice is assumed below, namely, that the noise is both homoscedastic, i.e., $\sigma_n^2$, regardless of the input location x, as well as task-independent, i.e., $\sigma_n^2$, regardless of the specific target function. This means that $\sigma_n^2$ is a fixed constant.

An encoder aggregator element 120 is represented in FIG. 1 in a schematic and simplified manner. Encoder aggregator element 120 includes at least one neural encoder network and an aggregator module. Different specific embodiments of encoder aggregator element 120 are explained later with reference to FIGS. 2 and 3.

In general, encoder aggregator element 120 is designed to determine a model uncertainty as a variance $\sigma_z^2$ of the Gaussian distribution and as a mean value $\mu_z$ of the Gaussian distribution via latent variables z from a set of contexts $D^c$.

In a further step, the latent variables z are extracted from the variance $\sigma_z^2$ of the Gaussian distribution and from the mean value $\mu_z$ of the Gaussian distribution of the output of the model.

The latent variables are not forwarded as inputs to neural decoder network 110, but rather correspond to the weights of neural decoder network 110. Thus, according to the present invention, the neural decoder network receives only the input location x, and a respective sample, i.e., a respective latent variable z, from the latent Gaussian distribution corresponds to an instantiation of neural decoder network 110. Neural decoder network 110 is therefore parameterized using the latent variable z. According to the present invention, the neural decoder network includes no trainable weights. The present invention therefore represents a more economical way of parameterizing the neural decoder network.

The model uncertainty, i.e., the variance $\sigma_z^2$, is calculated as a variance of a Gaussian distribution and the mean value $\mu_z$ of the Gaussian distribution via a latent variable z from a set of contexts $D^c$ of observations, i.e., $$p(z|D^c) = N(z|\mu_z, \sigma_z^2).$$

In principle, such an estimate is generally not exact, but is subject to an uncertainty. This is the case when the set of contexts $D^c$ is not informative enough in order to determine the function parameters, for example, due to ambiguity of the task. An ambiguity may be due to the fact that many functions generate the same set of context observations. This type of uncertainty is the uncertainty referred to as model uncertainty and the uncertainty quantified by the variance $\sigma_z^2$ of the latent space distribution $p(z|D^c)$.

Since z is a global, i.e., a function of a variably large set of context tuples, latent variable, a form of aggregator mechanism is required in order to enable the use of context data sets $D^c$ of variable size. To be able to represent a meaningful operation on data sets, such an aggregation must be invariant with respect to the permutations of the context data points $x_n$ and $y_n$. To fulfill this permutation condition, a mean value aggregation, schematically represented in FIG. 2, for example, may be used.

Figure 2:
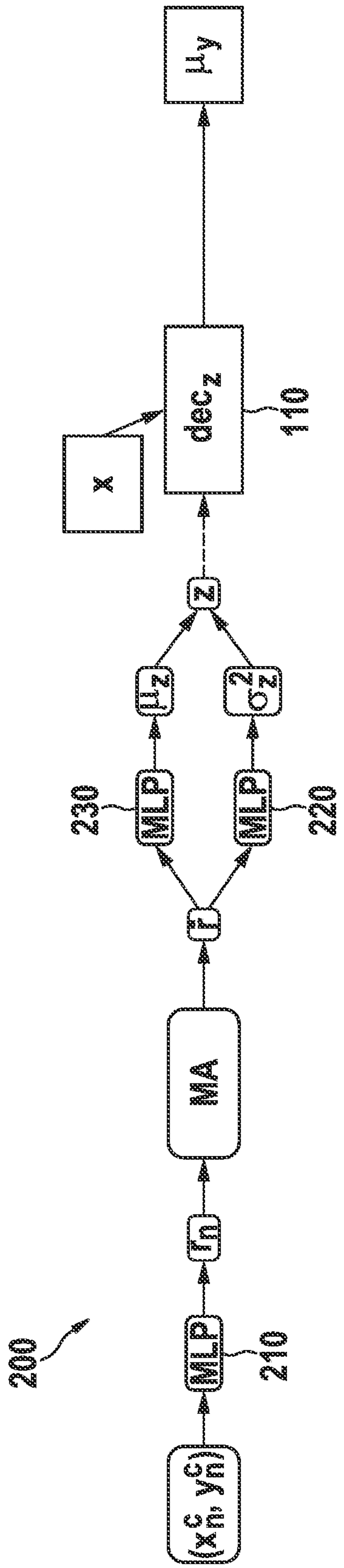
FIG. 2 shows a detail of an architecture of a neural process according to the specific embodiment from FIG. 1.

FIG. 2 schematically shows a network 200, for example, including a mean value aggregation (MA) using likelihood variation methods (VI). VI in this case represents an exemplary interference method. The architecture may, however, also be trained using other methods.

Boxes labeled with MLP indicate multi-layer perceptrons (MLP), including a number of hidden layers. The box with the designation "MA" refers to the traditional mean value aggregation.

The box labeled with z indicates the implementation of a random variable with a random distribution, which is parameterized using parameters provided by the incoming nodes.

Each context data pair $x_n,y_n$ is initially mapped by a neural network onto a corresponding latent observation $r_n$. A permutation-variant operation is then applied to the generated set $$\{r_n\}_{n=1}^{N}$$

in order to obtain an aggregated latent observation $\bar{r}$. One possibility in this context is the calculation of a mean value, namely, $$\bar{r} = 1/N \cdot \sum_{n=1}^{N} r_n.$$

It should be noted that this aggregated observation $\bar{r}$ is then used in order to parameterize a corresponding distribution for the latent variables z.

According to FIG. 2, encoder aggregator element 120 thus includes, for example, an aggregator model MA, and three encoder sections 210, 220, 230.

Figure 3:
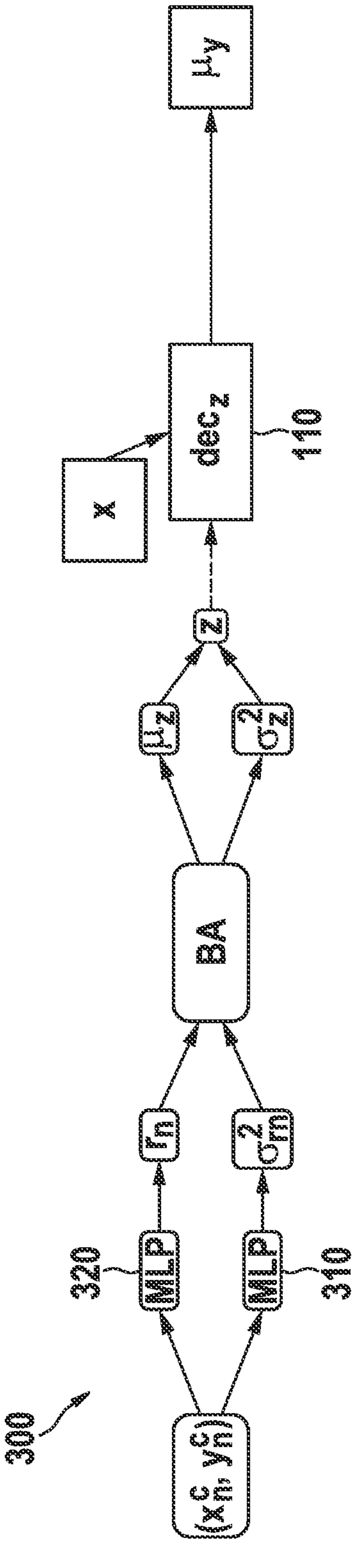
FIG. 3 shows a detail of an architecture of a neural process according to the specific embodiment from FIG. 1.

As an alternative to the mean value aggregation, an aggregation for the latent variable z may be determined using Bayesian inference. FIG. 3 schematically shows a network 300 including Bayesian aggregation (BA). The box with the designation "BA" refers to the Bayesian aggregation.

According to FIG. 3, encoder aggregator element 120 thus includes, for example, an aggregator model BA, and two encoder sections 310, 320.

Compared to the mean value aggregation, Bayesian aggregation avoids the diversion via an aggregated latent observation $\bar{r}$ and treats the latent variable z directly as an aggregated variable. This reflects a central observation for models including global latent variables. The aggregation of context data and the inference of hidden parameters are essentially the same mechanism. On this basis, it is possible to define probabilistic observation models $p(r|z)$ for r, which is a function of z. For a latent observation $$r_n = enc_{r,\phi}(x_n^c, y_n^c),$$

$p(z)$ is updated by calculating the posterior $p(z|r_n)=p(r_n|z)p(z)/p(r_n)$. By formulating the aggregation of context data as a Bayesian inference problem, the pieces of information contained in $D^c$ are aggregated directly into the statistical description of z. The Bayesian aggregation is further described, for example, in M. Volpp, F. Flürenbock, L. Grossberger, C. Daniel, G. Neumann; "BAYESIAN CONTEXT AGGREGATION FOR NEURAL PROCESSES," ICLR 2021.

Further specific embodiments of the present invention relate to the use of the method according to the described specific embodiments and/or of a neural network, in particular, of a neural process, including an architecture according to the described specific embodiments for ascertaining an, in particular, inadmissible, deviation of a system behavior of a technical system from a standard value range.

When ascertaining the deviation of the technical system, an artificial neural network utilizes, to which input data and output data of the technical unit are fed in a learning phase. As a result of the comparison with the input data and output data of the technical system, the corresponding links in the artificial neural network are created and the neural network is trained on the system behavior of the technical system.

A majority of training data sets used in the learning phase may include input variables measured at the technical system and/or calculated for the technical system. The majority of training data sets may contain information relating to operating states of the technical system. In addition or alternatively, the majority of training data sets may contain pieces of information relating to the surroundings of the technical system. In some examples, the majority of training data sets may contain sensor data. The computer-implemented machine learning system may be trained for a certain technical system in order to process data (for example, sensor data) accruing in this technical system and/or in its surroundings, and to calculate one or multiple output variables relevant for monitoring and/or for controlling the technical system. This may occur during the designing of the technical system. In this case, the computer-implemented machine learning system may be used for calculating the corresponding output variables as a function of the input variables. The data obtained may then be entered into a monitoring device and/or control device for the technical system. In other examples, the computer-implemented machine learning system may be used in the operation of the technical system in order to carry out monitoring tasks and/or control tasks.

The training data sets used in the learning phase may, according to the above definition, also be referred to as context data sets, $$\mathcal{D}_l^c.$$

The training data set $x_n,y_n$ used in the present description (for example, for a selected index l, where l=1 . . . L) may include the majority of training data points and may be made up of a first majority of data points $x_n$ and of a second majority of data points $y_n$. The second majority of data points, $y_n$, may be calculated, for example, using a given subset of functions from a general given function family $\mathcal{F}$ on the first majority of data points, $x_n$, in the same way as discussed further above. For example, the function family $\mathcal{F}$ may be selected so that it best fits the description of an operating state of a particular device considered. The functions and, in particular, the given subset of functions, may also have a similar statistical structure.

In a prediction phase following the learning phase, it is possible to reliably predict the system behavior of the technical system with the aid of the neural network. For this purpose, input data of the technical system are fed to the neural network in the prediction phase and output comparison data are calculated in the neural network, which are compared with output data of the technical system. If this comparison indicates that the difference of the output data of the technical system, which have been detected preferably as measured values, deviates from the output comparison data of the neural network and the deviation exceeds a limiting value, then an inadmissible deviation of the system behavior of the technical system from the standard value range is present. Suitable measures may thereupon be taken, for example, a warning signal may be generated or stored or sub-functions of the technical system may be deactivated (degradation of the technical unit). In the case of the inadmissible deviation, a switch may, if necessary, be made to alternative technical units.

A real technical system may be continuously monitored with the aid of the method described above. In the learning phase, the neural network is fed a sufficient number of pieces of information of the technical system both from its input side as well as from its output side, so that the technical system is able to be mapped and simulated in the neural network with sufficient accuracy. This allows the technical system in the subsequent prediction phase to be monitored and a deterioration of the system behavior to be predicted. In this way, the remaining service life of the technical system, in particular, is able to be predicted.

Specific types of applications relate, for example, to applications in various technical devices and systems. For example, the computer-implemented machine learning systems may be used for controlling and/or for monitoring a device.

A first example relates to the design of a technical device or of a technical system. In this context, the training data sets may contain measured data and/or synthetic data and/or software data, which play a role in the operating states of the technical device or of a technical system. The input data or output data may be state variables of the technical device or of a technical system and/or control variables of the technical device or of a technical system. In one example, the generation of the computer-implemented probabilistic machine learning system (for example, a probabilistic regressor or classifier) may include the mapping of an input vector of a dimension $\mathbb{R}^n$ to an output vector of a second dimension $\mathbb{R}^m$. Here, for example, the input vector may represent elements of a time series for at least one measured input state variable of the device. The output vector may represent at least one estimated output state variable of the device, which is predicted based on the generated a posteriori predictive distribution. In one example, the technical device may be a machine, for example, a motor (for example, an internal combustion engine, an electric motor or a hybrid motor). In other examples, the technical device may be a fuel cell. In one example, the measured input state variable of the device may include a rotational speed, a temperature, or a mass flow. In other examples, the measured input state variable of the device may include a combination thereof. In one example, the estimated output state variable of the device may include a torque, a degree of efficiency, a pressure ratio. In other examples, the estimated output state variable may include a combination thereof.

The various input variables and output variables may include complex, non-linear dependencies during the operation in a technical device. In one example, a parameterization of a characteristic diagram for the device (for example, for an internal combustion engine, for an electric motor, for a hybrid motor or for a fuel cell) may be modeled with the aid of the computer-implemented machine learning system of this description. The modeled characteristic diagram of the method according to the present invention most importantly enables the correct correlations between the various state variables of the device to be quickly and accurately provided. The characteristic diagram modeled in this manner may be used, for example, during the operation of the device (for example, of the motor) for monitoring and/or for controlling the motor (for example, in a motor control device). In one example, the characteristic diagram may indicate how a dynamic behavior (for example, an energy consumption) of a machine (for example, of a motor) is a function of various state variables of the machine (for example, rotational speed, temperature, mass flow, torque, degree of efficiency and pressure ratio).

The computer-implemented machine learning systems may be used for classifying a time series, in particular, for the classification of image data (i.e., the technical device is an image classifier). The image data may, for example, be camera data, LIDAR data, radar data, ultrasound data or thermal image data (for example, generated by corresponding sensors). In some examples, the computer-implemented machine learning systems may be designed for a monitoring device (for example, of a manufacturing process and/or for quality assurance) or for a medical imaging system (for example, for assessing diagnostic data) or may be used in such a device.

In other examples (or in addition), the computer-implemented machine learning systems may be designed or used for monitoring the operating state and/or the surroundings of an at least semi-autonomous robot. The at least semi-autonomous robot may be an autonomous vehicle (or another at least semi-autonomous conveying means or means of transportation). In other examples, the at least semi-autonomous robot may be an industrial robot. For example, a precise probabilistic estimate of the position and/or velocity, in particular, of the robotic arm, may be determined with the aid of the described regression using data of position sensors, and/or of velocity sensors and/or of torque sensors, in particular, of a robotic arm. In other examples, the technical device may be a machine or a group of machines (for example, of an industrial plant). For example, an operating state of a machine tool may be monitored. In these examples, the output data y may contain information relating to the operating state and/or to the surroundings of the respective technical device.

In further examples, the system to be monitored may be a communication network. In some examples, the network may be a telecommunication network (for example, a 5G network). In these examples, the input data x may contain workload data in nodes of the network and the output data y may contain information relating to the allocation of resources (for example, channels, bandwidth in channels of the network or other resources). In other examples, a network malfunction may be recognized.

In other examples (or in addition) the computer-implemented machine learning systems may be designed or used to control (or to regulate) a technical device. The technical device may, in turn, be one of the devices discussed above (or below) (for example, an at least semi-autonomous robot or a machine). In these examples, the output data y may contain a control variable of the respective technical system.

In yet other examples (or in addition), the computer-implemented machine learning systems may be designed or used to filter a signal. In some cases, the signal may be an audio signal or a video signal. In these examples, the output data y may contain a filtered signal.

The methods for generating and applying computer-implemented machine learning systems of the present description may be carried out on a computer-implemented system. The computer-implemented system may include at least one processor, at least one memory (which may contain programs which, when they are executed, carry out the methods of the present description), as well as at least one interface for inputs and outputs. The computer-implemented system may be a stand-alone system or a distributed system, which communicates over a network (for example, the Internet).

The present description also relates to computer-implemented machine learning systems, which are generated using the methods of the present description. The present description also relates to computer programs, which are configured to carry out all steps of the methods of the present description. In addition, the present description relates to machine-readable memory media (for example, optical memory media or read-only memories, for example, FLASH memories) on which computer programs are stored, which are configured to carry out all steps of the methods of the present description.

What is claimed is:

1. A computer-implemented method for estimating uncertainties using a neural network including a neural process, in a model, the model modeling a technical system and/or a system behavior of the technical system, the method comprising the following steps:

determining a model uncertainty as a variance ($\sigma_z^2$) of a Gaussian distribution and as a mean value ($\mu_z$) of the Gaussian distribution via latent variables (z) from a set of contexts ($D^c$);

determining a mean value ($\mu_y$) of an output of the model as a function of an input location (x) using a neural decoder network, wherein the latent variables (z) are used as weights of the neural decoder network, and wherein, for determining the mean value ($\mu_y$) of the output of the model, the neural decoder network receives, as input, the input location (x) and the latent variables are not forwarded to the neural decoder network;

ascertaining an inadmissible deviation of the system behavior of the technical system from a standard value range based on the mean value ($\mu_y$) of the output of the model; and outputting, in response to ascertaining the inadmissible deviation of the system behavior of the technical system from the standard value range, a warning signal.

2. The method as recited in claim 1, wherein the variance ($\sigma_z^2$) of the Gaussian distribution, where $$\sigma_z^2 = \sigma_z^2(D^c),$$

is calculated using the latent variables (z) from a set of contexts ($D^c$) of observations, wherein $$p(z|D^c) = N(z|\mu_z(D^c), \sigma_z^2(D^c)).$$

3. The method as recited in claim 1, wherein the mean value ($\mu_z$) of the Gaussian distribution, where $\mu_z=\mu_z(D^c)$, is calculated using the latent variables (z) from the set of contexts ($D^c$) of observations, wherein $$p(z|D^c) = N(z|\mu_z(D^c), \sigma_z^2(D^c)).$$

4. The method as recited in claim 1, wherein the neural decoder network parameterizes the output of the model, wherein a probability $$p(y|x, z) = N(y|\mu_y, \sigma_n^2).$$

5. The method as recited in claim 1, wherein the latent variables (z) are extracted from the variance ($\sigma_z^2$) of the Gaussian distribution and from the mean value ($\mu_z$) of the Gaussian distribution of the output of the model.

6. The method as recited in claim 1, further comprising: deactivating, in response to outputting the warning signal, one or more functions of the technical system.

7. The method as recited in claim 1, wherein, for setting the weights of the neural decoder network, the latent variables (z) are sampled from the Gaussian distribution having the mean value ($\mu_z$) and the variance ($\sigma_z^2$).

8. The method as recited in claim 1, wherein the neural decoder network receives only the input location (x) as input.

9. A system, comprising:

a non-transitory memory; and at least one processor coupled to the non-transitory memory, the non-transitory memory storing a program of a neural network including a neural process, the neural network configured to estimate uncertainties in a model, the model modeling a technical system and/or a system behavior of the technical system, wherein the at least one processor is configured to execute the program to perform operations including to:

determine a model uncertainty as a variance ($\sigma_z^2$) of a Gaussian distribution and as a mean value ($\mu_z$) of the Gaussian distribution via latent variables (z) from a set of contexts ($D^c$);

determine a mean value ($\mu_y$) of an output of the model as a function of an input location (x) using a neural decoder network, wherein the latent variables (z) are used as weights of the neural decoder network, and wherein, for determining the mean value ($\mu_y$) of the output of the model, the neural decoder network receives, as input, the input location (x) and the latent variables are not forwarded to the neural decoder network;

ascertain an inadmissible deviation of the system behavior of the technical system from a standard value range based on the mean value ($\mu_y$) of the output of the model; and output, in response to ascertaining the inadmissible deviation of the system behavior of the technical system from the standard value range, a warning signal.

10. The system as recited in claim 9, wherein the neural network includes at least one neural encoder network and/or at least one aggregator module, and the at least one neural encoder network and/or the at least one aggregator module is configured to determine the model uncertainty as a variance ($\sigma_z^z$) of the Gaussian distribution and the mean value ($\mu_z$) of the Gaussian distribution via the latent variables (z) from the set of contexts ($D^c$).

11. A training method for parameterizing a neural network, the neural network being configured to estimate uncertainties in a model, the neural network configured to:

determine a model uncertainty as a variance ($\sigma_z^2$) of a Gaussian distribution and as a mean value ($\mu_z$) of the Gaussian distribution via latent variables (z) from a set of contexts ($D^c$), and determine a mean value ($\mu_y$) of an output of the model as a function of an input location (x) using a neural decoder network based on the Gaussian distribution, wherein the latent variables (z) are used as weights of the neural decoder network, wherein the model models a technical system and/or a system behavior of the technical system, and the neural network includes at least one neural decoder network, wherein the latent variables (z) are used as the weights of the neural decoder network, and wherein the neural network includes at least one neural encoder network and/or at least one aggregator module, the at least one neural encoder network and/or the at least one aggregator module being configured to determine the model uncertainty as the variance ($\sigma_z^2$) of the Gaussian distribution and the mean value ($\mu_z$) of the Gaussian distribution using the latent variables (z) from the set of contexts ($D^c$), and wherein the training method comprises the following:

training of weights for the at least one neural encoder network and/or the at least one aggregator module, wherein the latent variables (z) are the weights of the neural decoder network.

12. The training method as recited in claim 11, wherein the method is a multi-task training method.

* * * * *